US010404451B2

United States Patent
Sohn et al.

(10) Patent No.: US 10,404,451 B2
(45) Date of Patent: Sep. 3, 2019

(54) APPARATUS AND METHOD FOR MESSAGE COMMUNICATION

(71) Applicants: SAMSUNG SDS CO., LTD., Seoul (KR); Industry-Academic Cooperation Foundation, Yonsei University, Seoul (KR)

(72) Inventors: Jung-Hoon Sohn, Seoul (KR); Seon-Young Lee, Seoul (KR); Tae-Kyoung Kwon, Seoul (KR); Sang-Ho Park, Seoul (KR); Hyo-Jin Yoon, Yongin-si (KR)

(73) Assignees: SAMSUNG SDS CO., LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 330 days.

(21) Appl. No.: 14/926,523

(22) Filed: Oct. 29, 2015

(65) Prior Publication Data

US 2016/0127126 A1  May 5, 2016

(30) Foreign Application Priority Data

Oct. 31, 2014  (KR) .................. 10-2014-0149743

(51) Int. Cl.
*H04L 9/08* (2006.01)
*H04L 29/06* (2006.01)
*H04L 9/30* (2006.01)

(52) U.S. Cl.
CPC .......... *H04L 9/0825* (2013.01); *H04L 9/0822* (2013.01); *H04L 9/0866* (2013.01); *H04L 9/3073* (2013.01); *H04L 63/0442* (2013.01)

(58) Field of Classification Search
CPC ... H04L 9/0825; H04L 9/2822; H04L 9/2866; H04L 9/3073; H04L 63/0442
USPC ........................................................ 713/171
See application file for complete search history.

(56) References Cited

U.S. PATENT DOCUMENTS

| | | | | |
|---|---|---|---|---|
| 7,254,709 B1 * | 8/2007 | Richard | ................ | G06Q 10/10 713/168 |
| 2015/0032827 A1 * | 1/2015 | Tyler | ...................... | H04L 51/16 709/206 |
| 2015/0113077 A1 * | 4/2015 | Dubie | .................... | H04L 51/12 709/206 |
| 2016/0044000 A1 * | 2/2016 | Cunningham | ............ | H04L 9/14 713/175 |

\* cited by examiner

*Primary Examiner* — Kambiz Zand
*Assistant Examiner* — Benjamin A Kaplan
(74) *Attorney, Agent, or Firm* — Sughrue Mion, PLLC (57) ABSTRACT

There are provided a message communication device and method. A message communication device according to an exemplary embodiment includes a header modifying unit configured to modify a message header by adding additional information used together with an identity when a public key corresponding to the identity of a recipient is generated to be the message header, and a message transmitting unit configured to transmit a message including data encrypted based on the public key and the modified message header.

30 Claims, 2 Drawing Sheets

APPARATUS AND METHOD FOR MESSAGE COMMUNICATION

CROSS-REFERENCE TO RELATED APPLICATION

This application claims priority to and the benefit of Korean Patent Application No. 10-2014-0149743, filed on Oct. 31, 2014, the disclosure of which is incorporated herein by reference in its entirety.

BACKGROUND

1. Field

Disclosed embodiments relate to a message communication technique, and more specifically, to technology for implementing an efficient identity-based encryption system.

2. Discussion of Related Art

In order to deliver data through communication channels and ensure confidentiality of the data, various cryptographic techniques have been developed. For example, public key-based encryption methods have been widely used for economical and flexible key management. In these methods, in order to prevent impersonation attacks, a public key infrastructure (PKI) can be applied. However, in a PKI technique, a certificate on which a trustable organization performs digital signing in order to verify an owner of a public key is used. When such a certificate is issued, stored, distributed and verified, a load is generated. On the other hand, in an identity-based encryption (IBE) technique, a public key is derived from an identity of a communication subject. Therefore, according to this technique, a load of a series of procedures in which the certificate is used to obtain the public key can be removed.

In encryption systems using the IBE technique, there is a need to update a public key corresponding to the same identity in order to reduce key management costs. As one example, when information indicating a variable date and/or time (for example, a key expiration date) is used to generate the public key, it is possible to prevent the same public key from being constantly generated for the same identity, and a previous public key and a private key paired therewith can be naturally discarded. For example, an identity-based authenticated key exchange (IBAKE) protocol is provided to settle a secret key reliably between two communication subjects using the IBE technique without management of the certificate for the public key, and the public key is generated using a time value to occasionally update the public key.

When the public key is generated in this manner, if additional information is used together with an identity of any communication subject, the public key does not match the identity of the communication subject itself, and the communication subject can obtain its private key from a private key generator (PKG) only when the above additional information is recognized. Therefore, in an IBAKE system of the related art, additional information of a date or time that can be easily recognized by two communication subjects (for example, without involvement of a server) was used and an update cycle of the public key was short. However, such a system has a limitation of being unable to use various types of additional information in order to generate the public key. Also, interest in a method of transferring the additional information described above to the communication subject that receives a message encrypted using the public key is insufficient.

SUMMARY OF THE INVENTION

Disclosed embodiments provide a message communication device and method.

According to an exemplary embodiment, there is provided a message communication device, including a header modifying unit configured to modify a message header by adding additional information used together with an identity when a public key corresponding to the identity of a recipient is generated to be the message header, and a message transmitting unit configured to transmit a message including data encrypted based on the public key and the modified message header.

The header modifying unit may modify the message header by adding the additional information to a custom field of the message header.

The public key may include a combination of the identity and the additional information, and the header modifying unit may modify the message header by adding the combination to the message header.

The additional information may have a form of a user-defined comment combined with the identity according to a protocol for transmitting the message.

The message transmitting unit may transmit the message using the combination as a destination address.

The message may be an electronic mail message, the identity may be an electronic mail address of the recipient, and the protocol may include Simple Mail Transfer Protocol (SMTP).

The additional information may represent at least one of a period of validity of the public key, a credential associated with a private key corresponding to the public key, a place for issuing the private key, a sub identity of the recipient, a random number, a policy applied to the recipient and a permission granted to the recipient.

The message communication device may further include an encryption processing unit configured to generate the public key using the identity and the additional information and generate the encrypted data using the public key.

The encryption processing unit may encrypt payload data using the public key, and the encrypted data may include the encrypted payload data.

The encryption processing unit may encrypt payload data using an encryption key and encrypt the encryption key using the public key, and the encrypted data may include the encrypted encryption key.

According to an exemplary embodiment, there is provided a message communication device, including a message receiving unit configured to receive a message including a message header containing additional information used together with an identity when a public key corresponding to the identity of a recipient is generated and data encrypted based on the public key, and a decryption processing unit configured to obtain a private key corresponding to the public key using the identity and the additional information and decrypt the encrypted data using the private key.

The additional information may be included in a custom field of the message header.

The public key may include a combination of the identity and the additional information, and the public key may be included in the message header.

The decryption processing unit may also identify the public key from the message header, and the decryption processing unit may obtain the private key using the public key.

The additional information may have a form of a user-defined comment combined with the identity according to a protocol used for transmitting the message from a message processing device that adds the additional information to the message header.

The message may be an electronic mail message, the identity may be an electronic mail address of the recipient, and the protocol may include SMTP.

The additional information may represent at least one of a period of validity of the public key, a credential associated with the private key, a place for issuing the private key, a sub identity of the recipient, a random number, a policy applied to the recipient and a permission granted to the recipient.

The encrypted data may include payload data encrypted based on the public key, and the decryption processing unit may decrypt the encrypted payload data using the private key.

The encrypted data may include an encryption key that is used to generate encrypted payload data and is then encrypted based on the public key, and the decryption processing unit may decrypt the encrypted encryption key using the private key and decrypt the encrypted payload data using the decrypted encryption key.

According to an exemplary embodiment, there is provided a message communication method, including modifying a message header by adding additional information used together with an identity when a public key corresponding to the identity of a recipient is generated to the message header, and transmitting a message including data encrypted based on the public key and the modified message header.

The modifying may include modifying the message header by adding the additional information to a custom field of the message header.

The public key may include a combination of the identity and the additional information, and the modifying may include modifying the message header by adding the combination to the message header.

The additional information may have a form of a user-defined comment combined with the identity according to a protocol for transmitting the message.

The transmitting may include transmitting the message using the combination as a destination address.

The message may be an electronic mail message, the identity may be an electronic mail address of the recipient, and the protocol may include SMTP.

The additional information may represent at least one of a period of validity of the public key, a credential associated with a private key corresponding to the public key, a place for issuing the private key, a sub identity of the recipient, a random number, a policy applied to the recipient and a permission granted to the recipient.

The message communication method may further include generating the public key using the identity and the additional information, and generating the encrypted data using the public key.

The generating may include encrypting payload data using the public key, and the encrypted data may include the encrypted payload data.

The generating may include encrypting payload data using an encryption key and encrypting the encryption key using the public key, and the encrypted data includes the encrypted encryption key.

According to an exemplary embodiment, there is provided a message communication method, including receiving a message including a message header containing additional information used together with an identity when a public key corresponding to the identity of a recipient is generated and data encrypted based on the public key, obtaining a private key corresponding to the public key using the identity and the additional information, and decrypting the encrypted data using the private key.

The additional information may be included in a custom field of the message header.

The public key may include a combination of the identity and the additional information, and the public key may be included in the message header.

The message communication method may further include identifying the public key from the message header, and the obtaining may include obtaining the private key using the public key.

The additional information may have a form of a user-defined comment combined with the identity according to a protocol used for transmitting the message from a message processing device that adds the additional information to the message header.

The message may be an electronic mail message, the identity may be an electronic mail address of the recipient, and the protocol may include SMTP.

The additional information may represent at least one of a period of validity of the public key, a credential associated with the private key, a place for issuing the private key, a sub identity of the recipient, a random number, a policy applied to the recipient and a permission granted to the recipient.

The encrypted data may include payload data encrypted based on the public key, and the decrypting may include decrypting the encrypted payload data using the private key.

The encrypted data may include an encryption key that is used to generate encrypted payload data and is then encrypted based on the public key, and the decrypting may include decrypting the encrypted encryption key using the private key and decrypting the encrypted payload data using the decrypted encryption key. According to an exemplary embodiment, there is provided a computer program that is connected to hardware and stored in a storage medium to execute the message communication method.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present invention will be described with reference to the drawings. The following detailed description is provided to help comprehensive understanding of methods, devices and/or systems described in this specification. However, these are only examples, and the present invention is not limited thereto.

When embodiments of the invention are described, if it is determined that detailed descriptions of known technology related to the present invention unnecessarily obscure the subject matter of the invention, detailed descriptions thereof will be omitted. Some terms described below are defined by considering functions in the invention and meanings may vary depending on, for example, a user or operator's intentions or customs. Therefore, the meanings of terms should be interpreted based on the scope throughout this specification. The terminology used in the following detailed description is provided to only describe embodiments of the present invention and not for purposes of limitation. Unless the context clearly indicates otherwise, the singular forms include the plural forms. It will be understood that the terms "comprises" or "includes" when used herein, specify some features, numbers, steps, operations, elements, and/or combinations thereof, but do not preclude the presence or possibility of one or more other features, numbers, steps, operations, elements, and/or combinations thereof in addition to the description.

Figure 1:
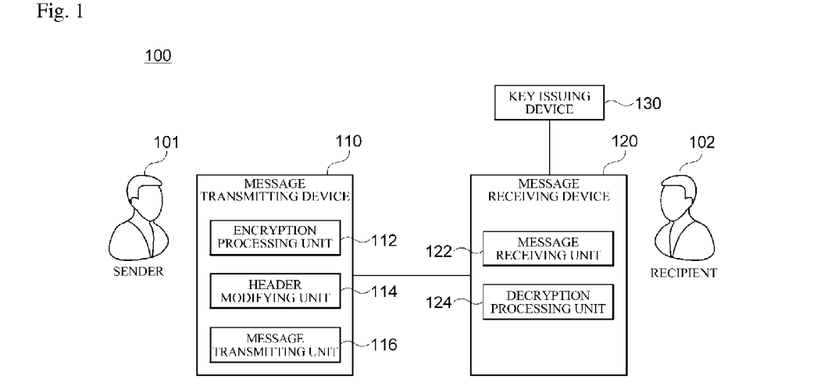
FIG. 1 is a diagram illustrating an identity-based encryption system according to an exemplary embodiment.

FIG. 1 is a diagram illustrating an identity-based encryption system according to an exemplary embodiment. An exemplary identity-based encryption system 100 includes a plurality of message communication devices configured to process messages to be exchanged. As illustrated in FIG. 1, it can be understood that the identity-based encryption system 100 includes message communication devices such as a message transmitting device 110 and a message receiving device 120. However, this is only an example. For example, although not illustrated in FIG. 1, the identity-based encryption system 100 may further include at least one additional message communication device in addition to the message transmitting device 110 and the message receiving device 120. Such an additional message communication device may perform at least some of operations of the message transmitting device 110 or operations of the message receiving device 120.

Also, as illustrated in FIG. 1, the identity-based encryption system 100 may further include a key issuing device 130 (for example, a device having a PKG function) configured to provide private keys to users.

Devices (for example, the message transmitting device 110, the message receiving device 120 and the key issuing device 130) for IBE in the identity-based encryption system 100 may be implemented or included in separate computing devices. Each of the computing devices may include at least one processor and a computer readable storage medium such as a memory that is accessible by the processor. The computer readable storage medium may be inside or outside of the processor, and connected to the processor using various well-known methods. A computer executable instruction may be stored in the computer readable storage medium. The processor may execute the instruction stored in the computer readable storage medium. When the instruction is executed by the processor, the execution may enable the computing device to perform operations according to an exemplary embodiment. Also, the computing device may further include an interface device configured to support input and output and/or communication between the computing device and at least one external device, and may be connected to the external device through the interface device. For example, devices (for example, the message transmitting device 110, the message receiving device 120 and the key issuing device 130) in the identity-based encryption system 100 may be communicatively connected via a network such as a local area network (LAN), a wide area network (WAN), a cellular network or the Internet, and a security channel (for example, a security channel on a transport layer) between any two devices among these devices may be established.

According to the exemplary embodiment, in response to a request of a sender 101, the message transmitting device 110 may transmit a message addressed to a recipient 102. Such a message may include a message header and payload data. The payload data represents basic message content that the sender 101 wants to actually deliver to the recipient 102. The message header represents information on the message (for example, in the form of a field set). As one example, the message transmitting device 110 may transmit an electronic mail message according to a protocol such as Simple Mail Transfer Protocol (SMTP).

In particular, the message transmitting device 110 may transmit the message in cipher. Specifically, the message transmitting device 110 may generate a public key from a known identity (for example, unique information of the recipient 102 such as an electronic mail address and a cellular phone number of the recipient 102) of the recipient 102 and predetermined additional information. Then, the message transmitting device 110 may encrypt predetermined message related data. Such message related data at least includes payload data in the message and may further include other data (that is, data necessary for decryption of an encrypted message) used for such encryption as necessary. The message transmitting device 110 may use the public key during the encryption process. As one example, the message transmitting device 110 may encrypt the payload data of the message using the public key. As an alternative example, the message transmitting device 110 may use an encryption key rather than the public key to encrypt the payload data of the message, and may encrypt other data (for example, the above encryption key) to be used for decryption of the encrypted payload data using the public key. Also, the message transmitting device 110 may add the additional information that is used together with the identity of the recipient 102 when the public key is generated to the message header and thus modify the message header. Therefore, the message transmitting device 110 may transmit a message including the modified message header and the encrypted data (for example, (i) the payload data encrypted based on the public key or (ii) the payload data encrypted based on the encryption key and/or the encryption key that is used for encryption of the payload data and then is encrypted using the public key).

Then, the message transmitted by the message transmitting device 110 may arrive at the message receiving device 120 via the network. As one example, the message receiving device 120 may obtain the electronic mail message delivered to a mail box of the recipient 102 according to a protocol such as Post Office Protocol (POP) or Internet Message Access Protocol (IMAP).

The message receiving device 120 may provide the message addressed to the recipient 102 in plaintext. Specifically, the message receiving device 120 may receive the message including the message header to which the additional information is added and data encrypted based on the public key (for example, the payload data encrypted based on the public key or the encryption key that is used for encryption of payload data and is then encrypted based on the public key) from the message transmitting device 110. Therefore, the message receiving device 120 may obtain the private key corresponding to the public key using the known identity of the recipient 102 and the additional information. For example, the message receiving device 120 may identify the additional information from the message header. When the message receiving device 120 is authorized to access the key issuing device 130 using the identity of the recipient 102, the message receiving device 120 may provide the public key to the key issuing device 130 and request the private key corresponding to the public key from the key issuing device 130. In response to the request, the key issuing device 130 may issue the private key paired with the public key to the message receiving device 120. Therefore, the message receiving device 120 may decrypt encrypted data within the received message using the private key. As one example, the message transmitting device 110 may encrypt the payload data based on the public key and then add the encrypted payload data to the message. In this case, the message receiving device 120 may decrypt the encrypted payload data using the private key. As another example, the payload data may be encrypted using the encryption key rather than the public key by the message transmitting device 110. The message transmitting device 110 may encrypt the encryption key using the public key, and then add it to the message together with the encrypted payload data. In this case, the message receiving device 120 may decrypt the encrypted encryption key using the private key, and then decrypt the encrypted payload data using the decrypted encryption key.

Hereinafter, for more detailed descriptions, an operating environment in which the identity-based encryption system 100 is applied to exchange the electronic mail message will be exemplified. The electronic mail message includes a header structured as a set of various fields and a body as payload data. However, such an operating environment is only an example. The identity-based encryption system 100 may be used to transfer different types of messages.

According to the exemplary embodiment, in order to perform identity-based encryption of the electronic mail message, the identity-based encryption system 100 may use an electronic mail address of a recipient (for example, the recipient 102) of the electronic mail message. The electronic mail address is one of widespread identity schemes, and generally has a format of "local@domain." Such a format is used for an account of Linux, cloud service and smartphone application stores (for example, an iOS application store (AppStore of Apple), and an Android application store (Google Play of Google)).

In general, in the electronic mail address of any user, the "local" part is used to identify the user, and the "domain" part of the electronic mail address is used to identify a mail server of the user. A standard format of the electronic mail address is defined in RFC-5321, RFC-5322 or the like. For example, according to RFC-5321 related to SMTP which is a protocol used for transferring the electronic mail, the "local" part has a maximum length of 64 octets, and the "domain" part has a maximum length of 255 octets. The electronic mail address has a maximum length of 300 octets by adding a token of "@."

Further, according to RFC-5322, the electronic mail address may include a comment in parentheses. For example, when an electronic mail message whose destination address is "(comment)address@example.com" is transmitted, content in parentheses may be processed as the comment, and the electronic mail message may be delivered to a mail box of a user who has an electronic mail address of "address@example.com." In particular, a maximum length of the comment is not specifically defined. Preferably, RFC-5321 requires the electronic mail message whose total length is at least 64000 octets or more. Hereinafter, as described above, the identity-based encryption system 100 may use the comment such that information used to generate the public key for encryption of the electronic mail message is shared between the message transmitting device 110 and the message receiving device 120.

In FIG. 1, the exemplary message transmitting device 110 includes an encryption processing unit 112, a header modifying unit 114 and a message transmitting unit 116. The modules of the message transmitting device 110 each may be implemented as hardware (for example, a processor, a memory and/or an interface device) of the computing device.

Figure 2:
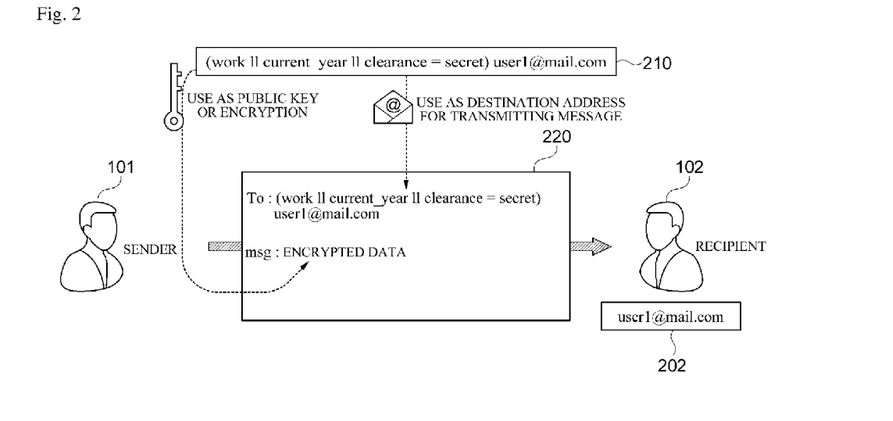
FIG. 2 is a diagram for describing an electronic mail message exchange in the identity-based encryption system according to the exemplary embodiment.

The encryption processing unit 112 generates a public key corresponding to the identity (for example, as illustrated in FIG. 2, an electronic mail address 202 of "user1@mail.com") of the recipient 102. For example, the encryption processing unit 112 may receive public parameters (for example, cryptographic content necessary for performing IBE operations) of the identity-based encryption system 100 from a public parameter server (PSS). Then, the encryption processing unit 112 may use the public parameters and the electronic mail address of the recipient 102 and generate the public key. In particular, in order to generate the public key, the encryption processing unit 112 may also use predetermined additional information. For example, such additional information may represent at least one of the following items.

A period of validity of the public key: the key issuing device 130 can issue the private key corresponding to the public key for the recipient 102 only within a period of validity, and it can be seen that the period of validity shows an expiration date of the private key.

A credential associated with the private key corresponding to the public key: the credential may indicate secret clearance for the recipient 102 to receive the private key) or a limitation on issuing the private key.

A place or local range for issuing the private key corresponding to the public key: when a request for the private key is transmitted to the key issuing device 130 outside the place or local range, issuing of the private key may be prevented.

A sub identity of the recipient 102: for example, when the recipient 102 performs a plurality of roles, the sub identity of the recipient 102 may be associated with one of the plurality of roles.

A random number: in order to easily discard a public key and a private key in the past, the random number may be used similarly to the period of validity of the public key.

A policy applied to the recipient 102: it is possible to designate, for example, delivering an acknowledgment when the recipient 102 browses the electronic mail message, prohibiting a reply even when the recipient 102 browses the electronic mail message, allowing a group name as the "domain" part of the electronic mail address, requesting an agreement of the policy from the recipient 102, or enforcing the recipient 102 to follow the set policy, and several designations that do not conflict among these may be applied together as necessary.

Permission granted to the recipient 102: it is possible to designate, for example, that the recipient 102 can access a specific service, or the recipient 102 is able to record data in a preset storage, and several designations that do not conflict among these may be applied together as necessary.

The additional information described above may be represented as at least one character (for example, an uppercase letter, a lowercase letter, a number and/or other characters) that can be used in the comment of the electronic mail address.

The public key is generated from the electronic mail address of the recipient 102 and the additional information, and then the encryption processing unit 112 generates the encrypted electronic mail message (including an encrypted body). As one example, the encryption processing unit 112 may encrypt the body of the electronic mail message using the public key. As another example, the encryption processing unit 112 may encrypt at least the body within the electronic mail message using the encryption key, and encrypt other data (for example, the above encryption key) to be used for decryption of the encrypted electronic mail message using the public key. For example, the encryption processing unit 112 may select a content-encryption key (CEK) as the encryption key, and encrypt the electronic mail message using the CEK. Then, the encryption processing unit 112 may encrypt the CEK using the public key. The encrypted CEK may be transmitted from the message transmitting unit 116 to the message receiving device 120 together with the encrypted electronic mail message.

The header modifying unit 114 modifies the header by adding the additional information described above to the header of the electronic mail message. For example, the header modifying unit 114 may generate a custom field within the header of the electronic mail message. The custom field may be implemented to store various pieces of information that the user desires, and considered as a field to be used for customization of the electronic mail message. The header modifying unit 114 may add the additional information to the custom field.

In particular, as described above, RFC-5322 related to SMTP allows the user-defined comment combined with the electronic mail address. In other words, while the header modifying unit 114 inserts the electronic mail address of the recipient 102 into a field (for example, the custom field) within the header of the electronic mail message, the comment combined with the electronic mail address may also be inserted into the field. Therefore, the header modifying unit 114 may add the additional information in the form of such a comment to the header of the electronic mail message.

The message transmitting unit 116 transmits the electronic mail message including the modified header and the encrypted data. For example, the electronic mail message transmitted from the message transmitting unit 116 may include the modified header and the body encrypted based on the public key. According to another example, the electronic mail message may include the modified header, the body encrypted based on the encryption key, and the encryption key encrypted based on the public key. Meanwhile, the message transmitting unit 116 may transmit the electronic mail message using a combination of the additional information in the form of a comment and the electronic mail address of the recipient 102 as a destination address. The transmitted electronic mail message may be delivered to the message receiving device 120 via the network.

In FIG. 1, the exemplary message receiving device 120 includes a message receiving unit 122 and a decryption processing unit 124. The modules of the message receiving device 120 may each be implemented as hardware (for example, a processor, a memory and/or an interface device) of the computing device.

The message receiving unit 122 receives the electronic mail message including the header modified to include the additional information and the data encrypted based on the public key (for example, (i) the body of the electronic mail message or (ii) other data (for example, the above encryption key)) to be used for decryption of the body encrypted using the encryption key. As described above, in the generation of the public key, the additional information was used together with the electronic mail address of the recipient 102. The decryption processing unit 124 uses the electronic mail address of the recipient 102 and the additional information, and obtains the private key corresponding to the public key.

For example, the decryption processing unit 124 may receive public parameters used for encryption which was performed by the encryption processing unit 112 of the message transmitting device 110 from the public parameter server. Then, the decryption processing unit 124 may receive the private key from the key issuing device 130 using the public key. As one example, when the public key includes the combination of the electronic mail address of the recipient 102 and the additional information, and is included in the header of the electronic mail message, the decryption processing unit 124 may identify the public key from the header, and obtain the private key using the identified public key. As another example, the decryption processing unit 124 may identify the additional information from the header of the electronic mail message, generate the same public key as the public key used for the above encryption based on the identified additional information and the electronic mail address of the recipient 102, and obtain the private key using the generated public key.

Further, the decryption processing unit 124 decrypts the encrypted data using the private key. According to one example, the decryption processing unit 124 may decrypt the body encrypted using the public key using the private key. According to another example, the decryption processing unit 124 may decrypt data (for example, the above encryption key) to be decrypted and used during a decryption process of the encrypted body (that is encrypted using the encryption key rather than the public key) as data encrypted using the public key using the private key, and decrypt the encrypted body using the decrypted data. For example, when the encrypted electronic mail message and the encrypted CEK are received in the message receiving unit 122, the decryption processing unit 124 may decrypt the CEK using the private key and public parameters. In order to decrypt the encrypted body, the decryption processing unit 124 may use the decrypted CEK.

As a more specific example, as illustrated in FIG. 2, the encryption processing unit 112 of the message transmitting device 110 may generate a public key having a format of an extended identity 210 such as "(work||current_year||clearance=secret)user1@mail.com." Such a public key includes a combination of the electronic mail address 202 of the recipient 102 and the additional information. In the extended identity 210, the electronic mail address 202 is shown without change. Also, in the extended identity 210, a part (that is, a part between two parentheses) inserted immediately before the electronic mail address 202 represents the additional information, the "work" part represents the sub identity of the recipient 102, the "current_year" part represents that the public key is valid only for this year, and the "clearance=secret" part represents that the private key corresponding to the public key can be issued for the recipient 102. Then, the encryption processing unit 112 may encrypt data (for example, body data) using the extended identity 210 as the public key.

Further, since the additional information in the extended identity 210 has a form of a comment of the electronic mail address 202, the message transmitting unit 116 of the message transmitting device 110 may transmit an electronic mail message 220 using the extended identity 210 as the destination address without change rather than the electronic mail address 202 itself. The electronic mail message 220 includes the header and the encrypted data (for example, encrypted body data). The header may include the custom field to which the extended identity 210 is added. The extended identity 210 may be added to the custom field by the header modifying unit 114 of the message transmitting device 110.

The message receiving unit 122 of the message receiving device 120 receives the electronic mail message 220, and then the decryption processing unit 124 of the message receiving device 120 may check the header of the electronic mail message 220, and extract the public key (that is, the extended identity 210) used for encryption from the custom field. The decryption processing unit 124 may obtain the private key using the public key, and decrypt the encrypted data (for example, the encrypted body) in the electronic mail message 220 using the private key.

As can be seen from the above descriptions, the exemplary identity-based encryption system 100 has the following properties.

The identity-based encryption system 100 uses the additional information in addition to the electronic mail address of the recipient 102 when the public key for IBE is generated. Therefore, a freshness property of the public key can be maintained at a certain level or more.

Such additional information is added to the header of the electronic mail message rather than the body of the electronic mail message. Therefore, the message receiving device 120 may read the header and identify the additional information, and there is no need to interpret the body for this purpose. Otherwise, complexity of the identity-based encryption system 100 will increase.

Further, the additional information to be added to the header may have a form of a comment combined with the electronic mail address according to a protocol (for example, SMTP) for transmitting the electronic mail message. Such additional information may be included in the custom field in the header. Therefore, (i) the verified protocol can be used without designing a separate protocol for transmitting the electronic mail message, and the identity-based encryption system 100 can be implemented at a low cost. Also, (ii) the additional information (for example, information that is unable to be synchronized between the message transmitting device 110 and the message receiving device 120) may include information having various types and a desired length as long as it is allowed by an existing protocol. For example, the period of validity of the public key, the policy applied to the recipient 102 in connection with the electronic mail message, or information indicating a permission granted to the recipient 102 may be used to generate the public key. This information may be inserted into the custom field as a form of a comment of the electronic mail address and delivered. As another example, several possible combinations of the electronic mail address and the comment may have the same effect as when the recipient 102 has several identities. Further, (iii) the combination of the electronic mail address and the comment may be used as the destination address for transmitting the electronic mail message. Therefore, if a field of the destination address is added to the header, the combination used for generating the public key may be delivered through the header of the electronic mail message according to such addition. In particular, when the combination is used as the public key, the same combination may be used as the destination address of the electronic mail message without change.

Figure 3:
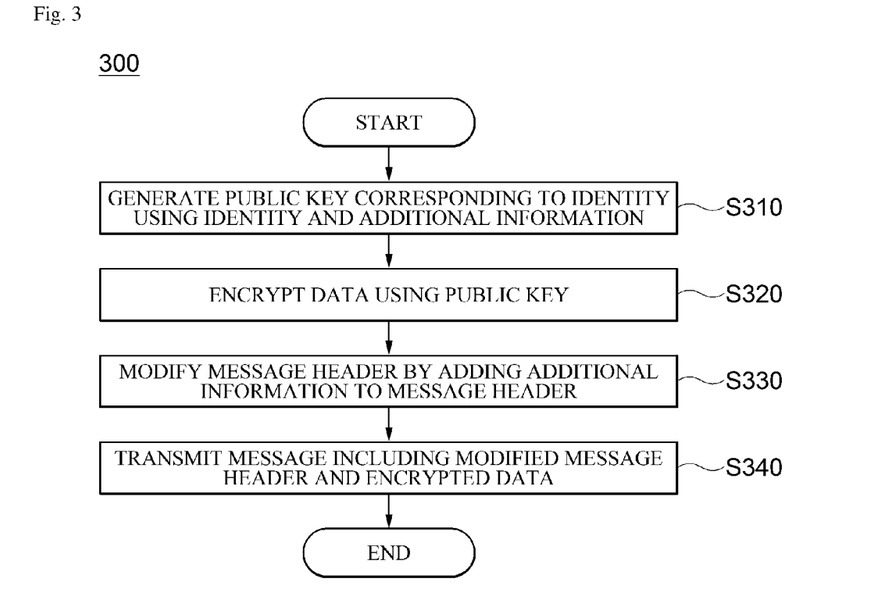
FIG. 3 is a flowchart illustrating a message communication process according to an exemplary embodiment.

FIG. 3 is a flowchart illustrating a message communication process according to an exemplary embodiment. For example, an exemplary message communication process 300 of FIG. 3 may be performed by the message transmitting device 110 of FIG. 1.

After a start operation, the message communication process 300 advances to operation S310. In operation S310, the encryption processing unit 112 of the message transmitting device 110 generates a public key corresponding to an identity of a recipient using an identity of the recipient (for example, the recipient 102) of the message and additional information. Such additional information may include various types of information. For example, the additional information may represent at least one of a period of validity of the public key, a credential associated with a private key corresponding to the public key, a place for issuing the private key, a sub identity of the recipient, a random number, a policy applied to the recipient, and a permission granted to the recipient.

In operation S320, the encryption processing unit 112 generates encrypted data using the public key. The encrypted data may include data encrypted based on the public key. For example, the encryption processing unit 112 may encrypt (i) payload data or (ii) other data (for example, the above encryption key used to generate encrypted payload data) to be decrypted and used during a decryption process of the payload data encrypted using the encryption key other than the public key using the public key.

In operation S330, the header modifying unit 114 of the message transmitting device 110 modifies the message header by adding the additional information to the message header. For example, the header modifying unit 114 may add the additional information to the field (for example, the custom field) of the message header. When the public key includes the combination of the identity of the recipient and the additional information, the header modifying unit 114 may modify the message header by adding the combination to the message header. Such additional information may have a form of a user-defined comment combined with the identity of the recipient according to a protocol for transmitting the message. For example, since RFC-5322 allows the comment combined with the electronic mail address of the recipient in connection with SMTP for transmitting the electronic mail message, the header modifying unit 114 may describe the comment using the additional information, and insert it into the custom field of the header of the electronic mail message together with the electronic mail address.

In operation S340, the message transmitting unit 116 of the message transmitting device transmits a message including the modified message header and the encrypted data (for example, data encrypted based on the public key). In some embodiments, the message transmitting unit 116 may transmit the message using the combination of the identity of the recipient and the additional information as the destination address.

Figure 4:
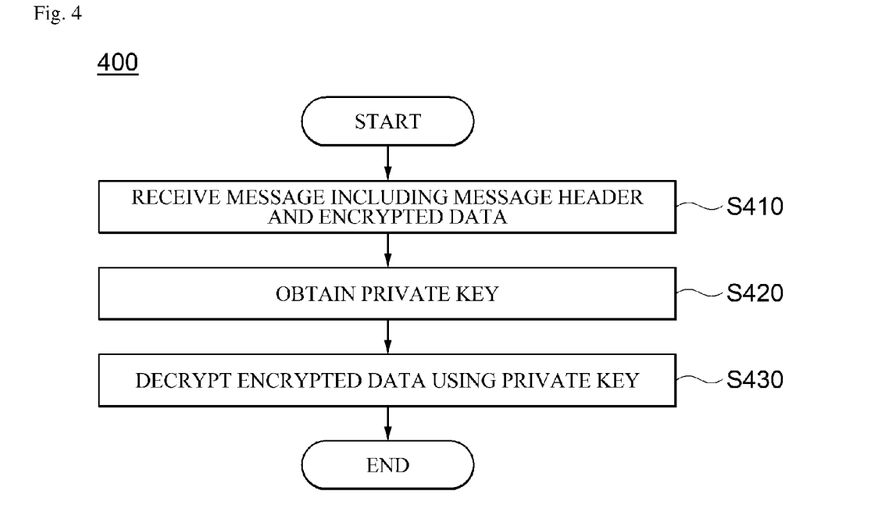
FIG. 4 is a flowchart illustrating a message communication process according to an exemplary embodiment.

FIG. 4 is a flowchart illustrating a message communication process according to an exemplary embodiment. For example, an exemplary process 400 of FIG. 4 may be performed by the message receiving device 120 of FIG. 1.

After a start operation, the message communication process 400 advances to operation S410. In operation S410, the message receiving unit 122 of the message receiving device 120 receives a message including a message header and encrypted data (for example, data encrypted based on the public key corresponding to the identity of a recipient). Also, in the message header, additional information used together with the identity of the recipient when the public key is generated may be included. For example, the additional information may be included in the field (for example, the custom field) of the message header. When a specific indicator or a preset value is included in the message header, the message receiving unit 122 may recognize that the message header includes the additional information described above.

As described above, the additional information may include various types of information. For example, the additional information may represent at least one of a period of validity of the public key, a credential associated with the private key corresponding to the public key, a place for issuing the private key, a sub identity of the recipient, a random number, a policy applied to the recipient, and a permission granted to the recipient.

Also, the additional information may have a form of a user-defined comment combined with the identity of the recipient according to a predetermined protocol. As described above, this protocol may be a protocol (for example, SMTP) that is used to transmit the message from a message processing device (for example, the message transmitting device 110) that adds the additional information to the message header.

In operation S420, the decryption processing unit 124 of the message receiving device 120 obtains the private key corresponding to the public key using the identity of the recipient and the additional information. When the public key including the combination of the identity of the recipient and the additional information is included in the custom field of the message header, the decryption processing unit 124 may identify the public key from the custom field, and obtain the private key using the identified public key.

For example, the decryption processing unit 124 may provide the public key to the key issuing device 130 and request the private key from the key issuing device 130. The key issuing device 130 may issue the private key to the decryption processing unit 124 in response to the request. When the additional information represents a restriction or prohibition of issuing the private key, the key issuing device 130 may not issue the private key despite the request. For example, the electronic mail message 220 of FIG. 2 is assumed to be received by the message receiving device 120. When the decryption processing unit 124 provides the public key of the extended identity 210 format to the key issuing device 130 within this year, the key issuing device 130 may issue the private key for the recipient 102. Otherwise, the key issuing device 130 may reject the request even when the request for issuing the private key for the recipient 102 is received.

In operation S430, the decryption processing unit 124 decrypts the encrypted data using the private key. For example, when the encrypted data includes the payload data encrypted based on the public key, the decryption processing unit 124 may decrypt the encrypted payload data using the private key corresponding to the public key. As another example, when the encrypted data includes the encryption key that is used to generate the encrypted payload data and then is encrypted based on the public key, the decryption processing unit 124 may decrypt the encrypted encryption key using the private key corresponding to the public key, and decrypt the encrypted payload data using the decrypted encryption key.

According to the predetermined embodiments, freshness of the public key used for IBE can be maintained at a certain level or more. Therefore, the private key corresponding to the public key can be easily discarded after a certain period of time.

The IBE system according to the predetermined embodiment can be built in an efficient and economical manner in compliance with a protocol that is widely used for message transmission.

According to the predetermined embodiment, the public key for IBE can be generated using various types of additional information together with the identity, such additional information can be shared without a significant increase of system complexity, and an additional function using the additional information can be easily developed.

Meanwhile, an exemplary embodiment may include a computer readable recording medium including a program for executing operations described in this specification in a computer. The computer readable recording medium may include a program instruction, a local data file, a local data structure, and/or combinations thereof. The computer readable recording medium may be specially designed and prepared for the present invention. Examples of the computer readable recording medium include magnetic media such as a hard disk, a floppy disk, and a magnetic tape, optical media such as a CD-ROM and a DVD, magneto-optical media such as a floptical disk, and a hard device such as a ROM, a RAM, or a flash memory, that is specially made to store and perform the program instruction. Examples of the program instruction may include a machine code generated by a compiler and a high-level language code that can be executed in a computer using an interpreter.

While representative embodiments of the preset invention have been described above in detail, it may be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

What is claimed is:

1. A message communication apparatus, comprising:
an encryption processor configured to generate a public key corresponding to an identity of a recipient, wherein the public key comprises an extended identity having the identity of the recipient and information relevant to the identity of the recipient;
a header modifier configured to modify a message header by adding the information; and
a message transmitter configured to transmit a message comprising data encrypted based on the public key and the modified message header.

2. The message communication apparatus according to claim 1,
wherein the header modifier is further configured to modify the message header by adding the information to a custom field of the message header.

3. The message communication apparatus according to claim 1,
wherein the header modifier is further configured to modify the message header by adding the combination to the message header.

4. The message communication apparatus according to claim 3,
wherein the information is formatted according to a transmitting protocol for the message by using a user-defined comment together with the identity of the recipient.

5. The message communication apparatus according to claim 4, wherein the message transmitter is further configured to transmit the message using the combination as a destination address.

6. The message communication apparatus according to claim 4,
wherein the message is an electronic mail message, wherein the identity of the recipient is an electronic mail address of the recipient, and wherein the protocol comprises Simple Mail Transfer Protocol (SMTP).

7. The message communication apparatus according to claim 1,
wherein the information represents at least one of: a period of validity of the public key, a credential associated with a private key corresponding to the public key, a place for issuing the private key, a sub identity of the recipient, a random number, a policy applied to the recipient, and a permission granted to the recipient.

8. The message communication apparatus according to claim 1,
wherein the encryption processor is further configured to generate the encrypted data using the public key.

9. The message communication apparatus according to claim 8,
wherein the encryption processor configured to encrypt payload data using the public key and the encrypted data comprises the encrypted payload data.

10. The message communication apparatus according to claim 8,
wherein the encryption processor configured to encrypt payload data using an encryption key and further configured to encrypt the encryption key using the public key, wherein the encrypted data comprises the encrypted encryption key.

11. A message communication apparatus, comprising:
a message receiver configured to receive a message comprising a message header having information relevant to an identity of a recipient and data encrypted using a public key comprising an extended identity having the identity of the recipient and the information; and
a decryption processor configured to obtain a private key corresponding to the public key using the identity of the recipient and the information, and to decrypt the encrypted data using the private key.

12. The message communication apparatus according to claim 11, wherein the information is in a custom field of the message header.

13. The message communication apparatus according to claim 11,
wherein the public key is in the message header.

14. The message communication apparatus according to claim 13,
wherein the decryption processor is further configured to identify the public key from the message header, and to obtain the private key using the public key.

15. The message communication apparatus according to claim 13,
wherein the additional information is formatted according to a transmitting protocol for the message from a message processor configured to add the information to the message header, by using a user-defined comment together with the identity of the recipient.

16. The message communication apparatus according to claim 15,
wherein the message is an electronic mail message, wherein the identity of the recipient is an electronic mail address of the recipient, and wherein the protocol comprises Simple Mail Transfer Protocol (SMTP).

17. The message communication apparatus according to claim 11,
wherein the information represents at least one of: a period of validity of the public key, a credential associated with the private key, a place for issuing the private key, a sub identity of the recipient, a random number, a policy applied to the recipient, and a permission granted to the recipient.

18. The message communication apparatus according to claim 11,
wherein the encrypted data includes payload data encrypted based on the public key, and
wherein the decryption processor is configured to decrypt the encrypted payload data using the private key.

19. The message communication apparatus according to claim 11,
wherein the encrypted data comprises an encryption key to generate encrypted payload data, wherein the encryption key is encrypted based on the public key, and wherein the decryption processor is configured to decrypt the encrypted encryption key using the private key and to decrypt the encrypted payload data using the decrypted encryption key.

20. A message communication method, comprising:
generating a public key corresponding to an identity of a recipient, wherein the public key comprises an extended identity having the identity of the recipient and information relevant to the identity of the recipient;
modifying a message header by adding the information; and
transmitting, by a transmitter, a message comprising the modified message header and data encrypted based on the public key.

21. The message communication method according to claim 20,
wherein the modifying the message header comprises modifying the message header by adding the information to a custom field of the message header.

22. The message communication method according to claim 20,
wherein the modifying the message header comprises modifying the message header by adding the combination to the message header.

23. The message communication method according to claim 20, further comprising:
generating the encrypted data using the public key.

24. The message communication method according to claim 23,
wherein the generating the encrypted data comprises encrypting payload data using the public key, and
wherein the encrypted data comprises the encrypted payload data.

25. The message communication method according to claim 23,
wherein the generating the encrypted data comprises: encrypting payload data using an encryption key and encrypting the encryption key using the public key; and
wherein the encrypted data comprises the encrypted encryption key.

26. A message communication method, comprising:
receiving, by a receiver, a message;
wherein the message comprises a message header having information relevant to an identity of a recipient and data encrypted based on a public key generated using comprising an extended identity having the identity of the recipient and the information;

obtaining a private key corresponding to the public key using the identity and the information; and decrypting the encrypted data using the private key.

27. The message communication method according to claim 26, wherein the encrypted data comprises payload data encrypted based on the public key; and the decrypting comprises decrypting the encrypted payload data using the private key.

28. The message communication method according to claim 26, wherein the encrypted data comprises an encryption key that is used to generate encrypted payload data and is encrypted based on the public key, and the decrypting comprises decrypting the encrypted encryption key using the private key and decrypting the encrypted payload data using the decrypted encryption key.

29. A non-transitory computer-readable medium storing a program to make a computer execute the method according to claim 20.

30. A non-transitory computer-readable medium storing a program to make a computer execute the method according to claim 26.

* * * * *